(12) United States Patent
Badalassi

(10) Patent No.: US 12,254,994 B1
(45) Date of Patent: Mar. 18, 2025

(54) FUSION REACTOR HAVING NESTED PEBBLE BED BLANKET

(71) Applicant: UT-Battelle, LLC, Oak Ridge, TN (US)

(72) Inventor: Vittorio Badalassi, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/600,271

(22) Filed: Mar. 8, 2024

(51) Int. Cl.
*G21B 1/19* (2006.01)
*G21B 1/05* (2006.01)
*G21B 1/13* (2006.01)

(52) U.S. Cl.
CPC ............... *G21B 1/19* (2013.01); *G21B 1/05* (2013.01); *G21B 1/13* (2013.01)

(58) Field of Classification Search
CPC .............. G21B 1/19; G21B 1/05; G21B 1/13
USPC .................................................. 376/109, 151
See application file for complete search history.

(56) References Cited

U.S. PATENT DOCUMENTS

| | | | |
|---|---|---|---|
| 2005/0135960 A1 | 6/2005 | Kawamura | |
| 2021/0280327 A1 | 9/2021 | Freidberg | |
| 2022/0375630 A1 | 11/2022 | Chrobak | |
| 2024/0304343 A1* | 9/2024 | Plaza | G21B 1/13 |

FOREIGN PATENT DOCUMENTS

| | | | | |
|---|---|---|---|---|
| EP | 1494244 A1 | 1/2005 | | |
| EP | 4006919 A1 * | 6/2022 | ............ | G21B 1/13 |
| JP | H0868881 A | 3/1996 | | |
| JP | 2018072233 A | 5/2018 | | |
| KR | 100981368 B1 | 9/2010 | | |
| WO | 2022106609 A1 | 5/2022 | | |

(Continued)

OTHER PUBLICATIONS

Abdou, M., Morley, N.B., Smolentsev, S., Ying, A., Malang, S., Rowcliffe, A., Ulrickson, M., "Blanket/First wall challenges and required R&D on the pathway to DEMO", Fusion Engineering and Design, 100:2-43 (2015).

(Continued)

*Primary Examiner* — Jack W Keith
*Assistant Examiner* — Daniel Wasil
(74) *Attorney, Agent, or Firm* — LEMPIA SUMMERFIELD KATZ LLC

(57) ABSTRACT

A nested pebble bed blanket surrounds a fusion reactor's vacuum chamber. The blanket includes stacks of nested pebbles composed of neutron multiplier shells filled with breeding spheroids. The shells have perforations passing through their inner and outer surfaces. The shells include therein perforated coolant distributor elements coupled to or unitary with the inner surfaces. Each perforated element is in line with a respective shell perforation, which allows coolant to flow into the sphere through the perforations and elements. When bombarded by neutrons, the nested pebbles produce fusion fuel to sustain fusion reactions. The coolant sweeps out the fusion fuel, and cools the breeding spheroids. Pebbles in the blanket are replenished with conveyor systems. A separator extracts the fusion fuel from the blanket coolant. Heat from the walls and the nested pebble bed is extracted by inert gases and then conveyed to a thermal storage and/or a power cycle.

30 Claims, 6 Drawing Sheets

(56) References Cited

FOREIGN PATENT DOCUMENTS

| WO | 2022112441 A1 | 6/2022 |
|---|---|---|
| WO | 2022162393 A1 | 8/2022 |
| WO | 2023220309 A1 | 11/2023 |

OTHER PUBLICATIONS

Brooks J.N., El-Guebaly L., Hassanein A. and Sizyuk T. (2015), Nucl. Fus. 55 043002.
Creely, A., Greenwald, M., Ballinger, S., Brunner, D., Canik, J., Doody, J., . . . Zhu, J. (2020). Overview of the SPARC tokamak. Journal of Plasma Physics, 86(5), 865860502. doi:10.1017/S0022377820001257.
D.A. Pappas, B. Lipschultz, B. LaBombard, M.J. May, C.S. Pitcher, "Molybdenum sources and transport in the Alcator C-Mod tokamak", Journal of Nuclear Materials, vols. 266-269, (1999), pp. 635-641, ISSN 0022-3115, https://doi.org/10.1016/S0022-3115(98)00597-2.
E. Proust, L. Anzidei, M. Dalle Donne, U. Fischer, T. Kuroda, "Solid breeder blanket design and tritium breeding", Fusion Engineering and Design, vol. 16, 1991, pp. 73-84, ISSN 0920-3796, https://doi.org/10.1016/0920-3796(91)90184-R.
Fabritsiev S.A., Gosudarenkova V.A., Potapova V.A., Rybin, V.V., Kosachev L.S., Chakin V.P., Pokrovsky A.S. and Barabash V.R. 1992 J. Nucl. Mater. 191-4 426-9.
Fernández, A.G., Galleguillos, H., Fuentealba, E et al., "Thermal characterization of HITEC molten salt for energy storage in solar linear concentrated technology", J. Therm. Anal. Calorim. 122, 3-9 (2015), https://doi.org/10.1007/$10973-015-4715-9.
Gilbert M.R., Packer L.W., Sublet J. and Forrest R.A. 2014, Nucl. Sci. Eng. 177 291-306.
Guangming Zhou, Francisco Hernandez, Lorenzo V. Boccaccini, Hongli Chen, Minyou Ye, "Preliminary structural analysis of the new HCPB blanket for EU DEMO reactor", International Journal of Hydrogen Energy, vol. 41, Issue 17, 2016, pp. 7053-7058, ISSN 0360-3199, https://doi.org/10.1016/j.ijhydene.2016.01.064.
Jae-Hwan Kim, Taehyun Hwang, Suguru Nakano, Mitsutaka Miyamoto, Hirotomo Iwakiri, Masaru Nakamichi, "Deuterium desorption and retention of Beryllium intermetallic compounds for fusion applications", Journal of Nuclear Materials, vol. 550, 2021, 152936, ISSN 0022-3115, https://doi.org/10.1016/j.jnucmat.2021.152936.
Kunihiko Tsuchiya, Katsuhiro Fuchinoue, Shigeru Saito, Kazutoshi Watarumi, Takemi Furuya, Hiroshi Kawamura, "Fabrication development of Li2O pebbles by wet process", Journal of Nuclear Materials, vol. 253, Issues 1-3, 1998, pp. 196-202, ISSN 0022-3115, https://doi.org/10.1016/S0022-3115(97)00312-7.
M.R. Gilbert, L.W. Packer, and T. Stainer, "Experimental validation of inventory simulations on molybdenum and its isotopes for fusion applications", Nuclear Fusion 60, 2020, 106022.
Masaru Nakamichi, Jae-Hwan Kim, Petr Kurinskiy, Characterization of vanadium beryllide pebble bed for the Japan DEMO blanket application, Fusion Engineering and Design, vol. 136, Part A, (2018), pp. 125-127, ISSN 0920-3796, https://doi.org/10.1016/j.fusengdes.2018.01.022.
Rieth M. et al 2013 J. Nucl. Mater. 432 482-500.
Rozenkevich, M.B., Kulov, N.N., Pak, Y.S. et al. Removal of Tritium from Gas Flows from Working Areas of Nuclear Facilities. Theor Found Chem Eng 57, 239-247 (2023). https://doi.org/10.1134/S0040579523030156.
Ruichong Chen, Jiangi Qi, Qiwu Shi, Yanli Shi, Hailiang Wang, Hao Guo, Yuanyuan Zeng, Mao Yang, Zhijun Liao, Tiecheng Lu, "Highly efficient preparation of Li2O breeder materials with core-shell structure by oil-based granulation route", Journal of the American Ceramic Society, vol. 103 , Issue 10, pp. 5612-5623, 2020, https://doi.org/10.1111/jace.17336.
Ruichong Chen, Mao Yang, Yanli Shi, Hailiang Wang, Hao Guo, Yuanyuan Zeng, Jiangi Qi, Qiwu Shi, Zhijun Liao, Tiecheng Lu, "Low-temperature fabrication of Li2O porous ceramic pebbles by two-stage support decomposition", International Journal of Hydrogen Energy, vol. 44, Issue 36, 2019, pp. 20249-20256, ISSN 0360-3199, https://doi.org/10.1016/j.ijhydene.2019.06.009.
S. R. Breon, N. R. Chellew, R. G. Clemmer, and J. C. Hoh, "Gamma Irradiation of Nitrate-Based Salts", ANL/FPP/TM-129, (Mar. 1980).
Steven J. Zinkle, Jeremy T. Busby, Structural materials for fission & fusion energy, Materials Today, vol. 12, Issue 11, 2009, pp. 12-19, ISSN 1369-7021, https://doi.org/10.1016/S1369-7021(09)70294-9.
Timur Kulsartov, Zhanna Zaurbekova, Regina Knitter, Asset Shaimerdenov, Yevgen Chikhray, Saulet Askerbekov, Assyl Akhanov, Inesh Kenzhina, Gunta Kizane, Yergazy Kenzhin, Magzhan Aitkulov, Darkhan Sairanbayev, Yuriy Gordienko, Yuriy Ponkratov, "Studies of two-phase lithium ceramics Li4SiO4—Li2TiO3 under conditions of neutron irradiation", Nuclear Materials and Energy, vol. 30, 2022, 101129, ISSN 2352-1791, https://doi.org/10.1016/j.nme.2022.101129.
Ueda Y. et al 2017 Nucl. Fus. 57 092006.
V. Badalassi, A. Sircar, J. M. Solberg, J. W. Bae, K. Borowiec, P. Huang, S. Smolentsev & E. Peterson (2023) FERMI: Fusion Energy Reactor Models Integrator, Fusion Science and Technology, 79:3, 345-379, DOI: 10.1080/15361055.2022.2151818.
Yongjin Feng, Baoping Gong, Hao Cheng, Long Wang, XiaoyuWang, "Effects of fixed wall and pebble size ratio on packing properties and contact force distribution in binary-sized pebble mixed beds at the maximum packing efficiency state", Powder Technology 390 (2021) 504-520.
Bae, et al., "ARC reactor neutronics multi-code validation," IOP Publishing - International Atomic Energy Agency, Nucl. Fusion 62 (2022) (11 pages).
Bae, et al., "Impact of fusion reactor neutronics modeling for transmutation and thermal feedback," IOP Publishing - International Atomic Energy Agency, Nucl. Fusion 63 (2023) (16 pages).
Borowiec, et al. "Fermi: Fusion Energy Reactor Models Integrator Integrated High-fidelity Multiphysics Framework for Fusion Modeling," IAEA-CN-316/2427 (8 pages) 2023.
Borowiec, et al., "3D high-fidelity automated neutronics guided optimization of fusion blanket designs," Fusion Engineering and Design 200 (2024) (7 pages).
A. Ying, M. Abdou, C. Wong, S. Malang, N. Morley, M. Sawan, B. Merrill, D.K. Sze, R. Kurtz, S. Willms, M. Ulrickson, S. Zinkle, "An overview of US Iter test blanket module program", Fusion Engineering and Design, vol. 81, Issues 1-7, (2006), pp. 433-441, ISSN 0920-3796, https://doi.org/10.1016/j.fusengdes.2005.06.379. (9 pages).
C.E. Kessel, J.P. Blanchard, A. Davis, L. El-Guebaly, L.M. Garrison, N.M. Ghoniem, p. W. Humrickhouse, Y. Huang, Y. Katoh, A. Khodak, E.P. Marriott, S. Malang, N.B. Morley, G.H. Neilson, J. Rapp, M.E. Rensink, T.D. Rognlien, A.F. Rowcliffe, S. Smolentsev, L.L. Snead, M.S. Tillack, P. Titus, L.M. Waganer, G.M. Wallace, S.J. Wukitch, A. Ying, K. Young, Y. Zhai, "Overview of the fusion nuclear science facility, a credible break-in step on the path to fusion energy", Fusion Engineering and Design, vol. 135, Part B, (2018), pp. 236-270, ISSN 0920-3796, https://doi.

* cited by examiner

FUSION REACTOR HAVING NESTED PEBBLE BED BLANKET

1. STATEMENT REGARDING FEDERALLY SPONSORED RESEARCH AND DEVELOPMENT

These inventions were made with the support of the United States government under Contract No. DE-AC05-00OR22725 awarded by the United States Department of Energy. The United States government has certain rights in the inventions.

2. TECHNICAL FIELD

This disclosure relates to systems providing plasma containment, tritium breeding, radiation shielding, and energy extraction in fusion devices, enabling commercial fusion power plants.

3. RELATED ART

Processes that combine nuclei while releasing energy are known as fusion reactions. The sun and other stars fuse hydrogen nuclei to form helium, releasing energy in the form of electromagnetic radiation and particles' kinetic energy by such reactions. Fusion reactors replicate interstellar fusion reactions in a controlled way.

One of the challenges of achieving fusion reactions is maintaining an extremely high temperature and pressure for a long enough time to "ignite" the fusion process and have a net power output for a practical commercial fusion power plant. An important technology is the "blanket" which has the roles of tritium breeding, power extraction, physical boundary for the plasma, radiation shielding, and a safety function. Some blankets require expensive, highly enriched tritium breeding materials such as Lithium-6, and some render insufficient breeding ratios. Some generate disruptive magnetohydrodynamic effects, some use very corrosive and reactive coolants, and some do not allow easy tritium separation and breeder refueling. The "nested pebble bed blanket" is a revolutionary blanket design that enables commercial energy production from future fusion power plants.

DESCRIPTION OF THE DRAWINGS

The disclosure is better understood with reference to the following drawings and descriptions. The elements in the figures are not necessarily to scale; emphasis is instead being placed upon illustrating the principles of the disclosure. Moreover, in the figures, like-referenced numerals designate corresponding parts throughout the different views.

DETAILED DESCRIPTION

Figure 1:
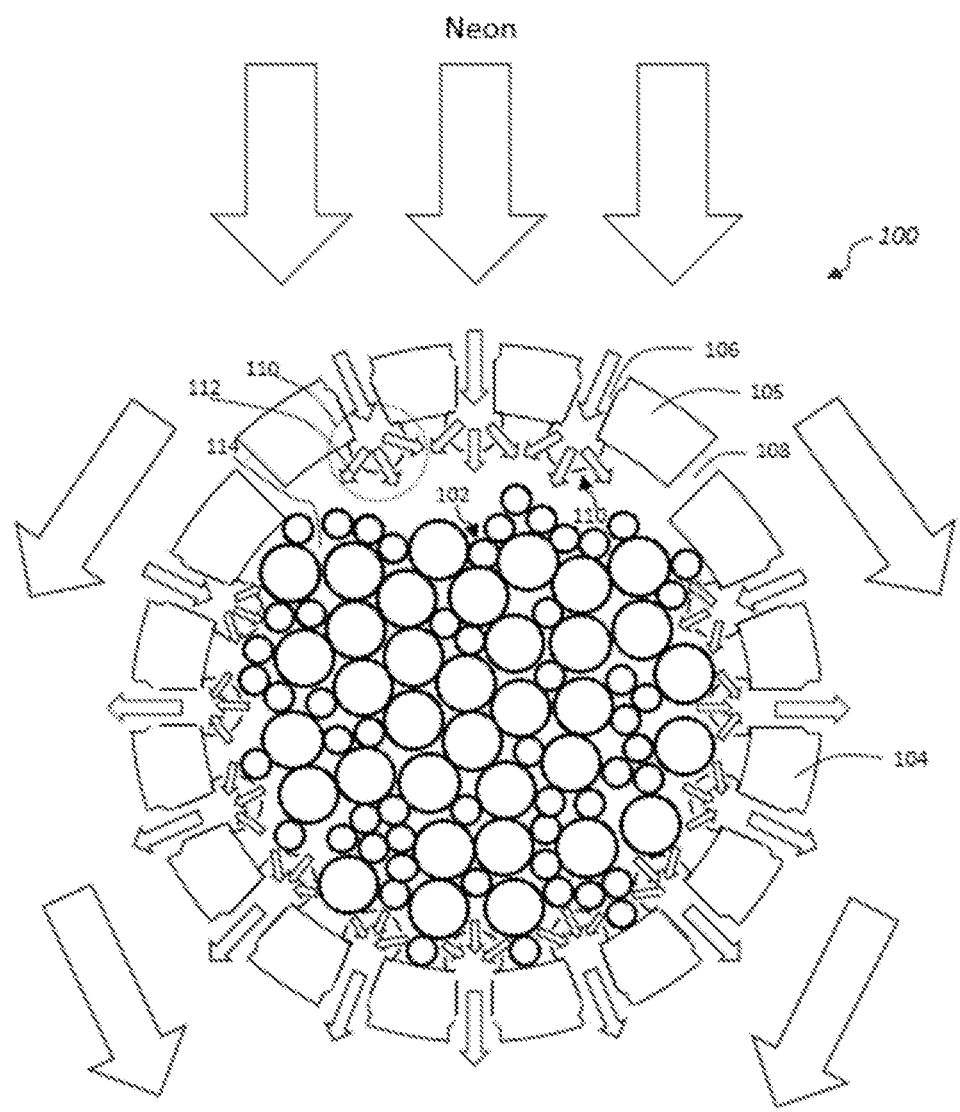
FIG. 1 is an enlarged cross-sectional view of the "nested pebble" composed of tritium breeding spheroids (e.g., lithium ceramics) enclosed within a neutron multiplier shell (e.g., beryllide) showing coolant flow (e.g., neon) through the neutron multiplier shell, purging various gases (tritium, helium, tritiated water steam, and minor others).

A nested pebble bed blanket (referred to as a blanket or a system) has high thermal efficiency, a high tritium breeding ratio (higher than 1.2) using natural lithium isotopic composition, and it shields the structural containment and the magnets of fusion reactors. The nested pebble bed blanket uses reduced activation steel structures, minimizing the production of long-term radioactive isotopes, has effectively no corrosion and reactivity problems, can sustain very high temperatures (up to 1200)° ° C., and can be easily refueled online without disrupting the operation of fusion reactors. Nested pebble bed blankets generate no magnetohydrodynamics phenomena, facilitate mature tritium extractions, and eliminate exposure to water moisture. The nested pebble bed blanket is regenerative, adaptable, and cost-effective.

In the efficient D-T fusion reaction, deuterium 2H and tritium T (hydrogen isotopic variants) combine to form helium He and one neutron plus a significant amount of energy (equation 1):

$$^{2}H + T \rightarrow {}^{4}He + n + 17.6 \text{ MeV} \qquad (1)$$

where MeV represents a million electron volts.

Deuterium is one of two stable isotopes of hydrogen (the other being protium or H), and it can be found in nature albeit in low concentrations (deuterium has a natural abundance in Earth's oceans in the heavy water form of about one atom of deuterium among every 6,420 atoms of hydrogen). Tritium is not a stable isotope of hydrogen and is extremely rare on Earth.

To sustain D-T fusion reactions then, tritium must be produced, and this can be achieved in the fusion reactor 402; tritium may be bred from neutrons generated by the fusion reactions (equation 1) reacting with the isotopes lithium-6 and lithium-7, as in equations 2 and 3:

$$_{3}{}^{6}Li + n \rightarrow T + \alpha + 4.78 \text{ MeV} \qquad (2)$$

$$_{3}{}^{7}Li + n \rightarrow T + \alpha + n - 2.47 \text{ MeV} \qquad (3)$$

Here, $^{6}_{3}Li$ represents lithium-6, $^{7}_{3}Li$ represents lithium-7, n represents a neutron, T represents tritium, and a represents an alpha particle (e.g., that comprises two protons and two neutrons). In equation 2 for example, lithium-6 ($^{6}_{3}Li$) is bombarded by a neutron (n), which undergoes a nuclear reaction that results in the formation of tritium (T), and an alpha particle (α). The reaction releases energy, about 4.78 MeV (4.78 million electron volts) are released during the reaction; note that the natural isotopic composition of lithium is 7.5% Lithium-6 and 92.5% Lithium-7 and the lithium-6 reaction with neutrons (equation 2) is much easier (it happens with any neutron energy) than the lithium-7 reaction with neutrons; to have a self-sustaining fusion process, a tritium breeding ratio, which is the ratio of tritium generated by a fusion reaction versus the tritium burnt in that reaction, should be greater than about 1.15. To achieve this number, typical fusion reactor designs require expensive up to 90% enriched lithium-6 breeders. The nested pebble bed blanket has a tritium breeding ratio greater than 1.2 using cheap, natural lithium isotopic composition.

FIG. 1 shows an exemplary nested pebble 100 which is comprised of solid or substantially solid breeder spheroids 102 encased within a neutron multiplier shell 104. The neutron multiplier shell 104 may comprise beryllium atoms in a beryllide (beryllium-vanadium or beryllium-titanium) compound or bonded with other elements in a lattice structure. The breeder spheroids 102 may be generated through chemical and thermal processes creating ceramic breeder spheroids 102 that maximize the lithium content and the tritium breeding, that are hard (e.g., they resist scratching, abrasion, and penetrations, for example) and that are resistant to high temperatures (up to 1200° C.). Exemplary breeder spheroids 102 may comprise compositions of lithium ceramics such as lithium oxide ($Li_2O$), lithium orthosilicate ($Li_4SiO_4$), and/or lithium metatitanate ($Li_2TiO_3$). In use, an exemplary fluid such as an inert gas like neon (Ne) or argon (Ar) or a liquid like beryllium chloride ($BeCl_2$), for example, impinges the neutron multiplier shell 104, with some fluid flowing about its outer surface and other portions flowing through the neutron multiplier shell 104 via the perforations 106. A plurality of flow coolant distributor elements 110 are disposed on continuous portions of the inner surfaces of the neutron multiplier shell 104 and are fastened in line with the perforations 106. The fluid cools the shell 104 and the breeder spheroids 102 and sweeps helium (He), tritium ($^3_1H$ or T), and tritiated water (HTO) (produced by the neutron-lithium nuclear reaction in the breeder spheroids 102) from and through the voids 114 between the breeder spheroids 102. The swept helium, tritium, tritiated water, and coolant inert gas flow out of the neutron multiplier shell 104 through some perforations (holes) 106 and a flow distributor 110 that in some systems may have hexagonal-shaped perforations 112. To maximize lithium (Li) content, some lithium ceramic breeder spheroids 102 and beryllide neutron multiplier shells 104, for example, are binary-sized and have different-sized diameters, respectively. In some exemplary nested pebble bed blankets, the nested pebbles 100 have at least two sizes of neutron multiplier shells 104 and at least two sizes of embedded breeder spheroids 102. For example, the breeder spheroids 102 may have three-to-one diameter ratios (3:1), as do the neutron multiplier shells 104. In some other systems, the breeder spheroids 102 have a single size, e.g., single-size ellipsoids and/or all of the neutron multiplier shells 104 have one size too. FIG. 1 also shows a hatch 105 of the shell 104 to load/unload the spheroids 102 (see also the gap 108). The hatch 105 can be mechanically coupled to the neutron multiplier shells 104 making it movable and lockable or it may be securely fastened to the neutron multiplier shells 104 with a fastener such as through a screwing or thermal bonding, for example.

Figure 2:
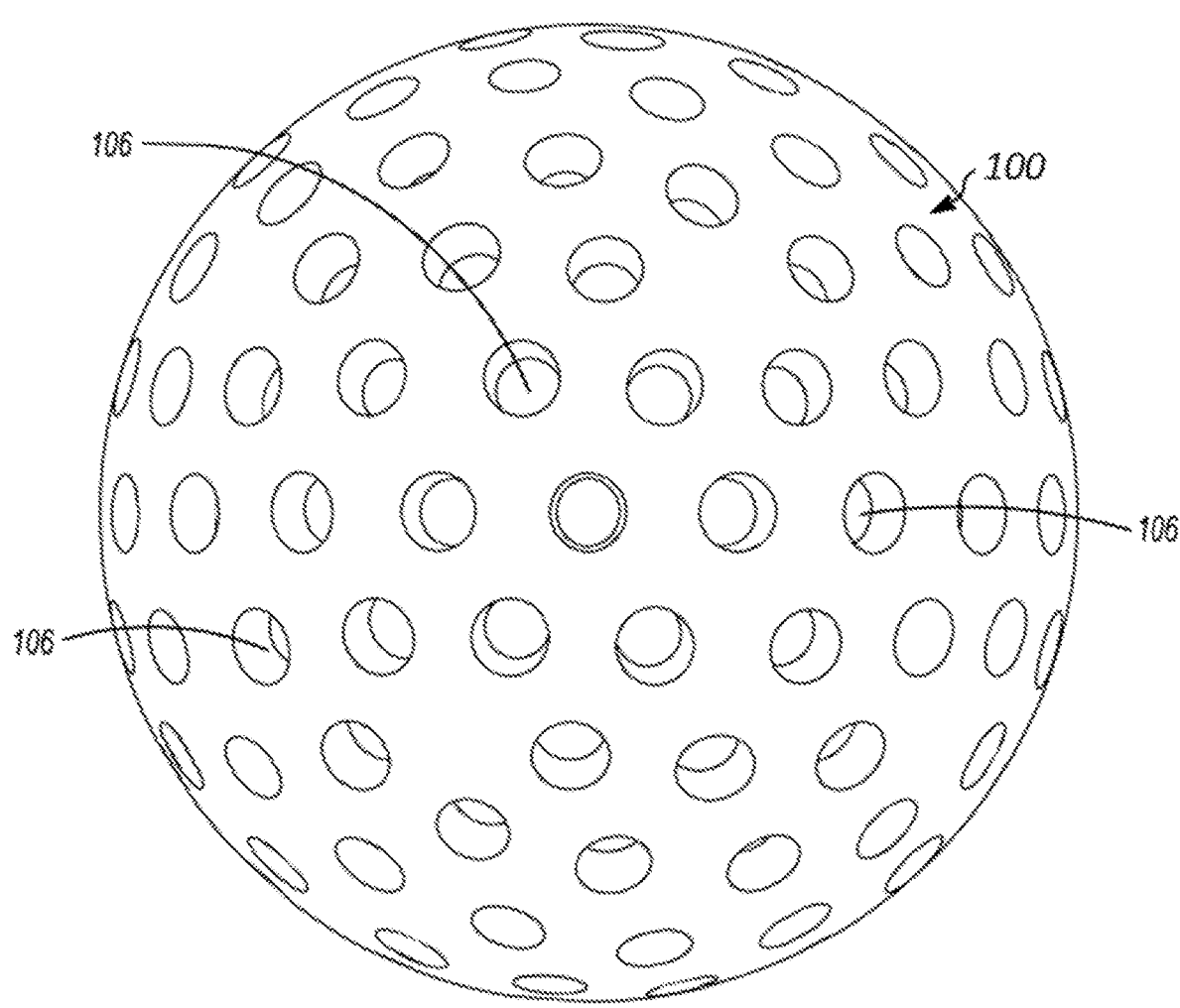
FIG. 2 is an enlarged three-dimensional view of an exemplary nested pebble.
Figure 3:
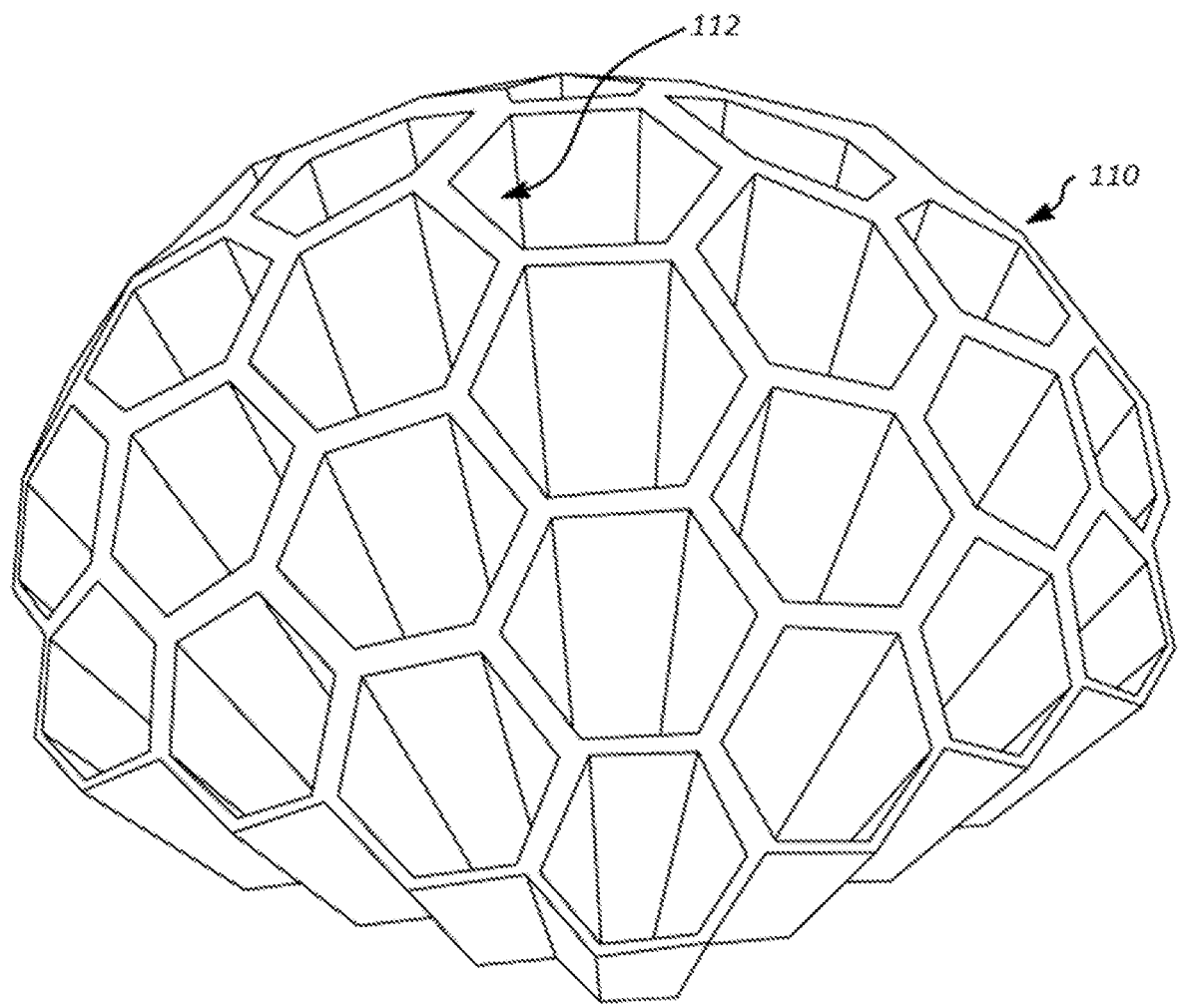
FIG. 3 is an enlarged view of a flow distributor.

FIG. 2 shows a nested pebble in three dimensions that has a series of perforations (holes) 106, rendering it a porous pebble. FIG. 3 shows the flow coolant distributor elements 110 having a plurality of inward perforations (holes) 112 smaller than the outer surfaces perforations 106 of the neutron multiplier shell 104 and smaller than the breeder spheroids 102 to keep the flow section comparable to the section 106 but restricting the exhaust of the breeder spheroids 102. The perforations (holes) 112 can have an optimized hexagonal shape, forming a honeycomb structure such that its outer surface resembles a beehive of channels terminating at a continuous interior spherical boundary or spherical space. The hexagonal patterns of cells and the hexagonal channels are arranged adjacent to one another, maximizing the surface flow area.

Figure 4:
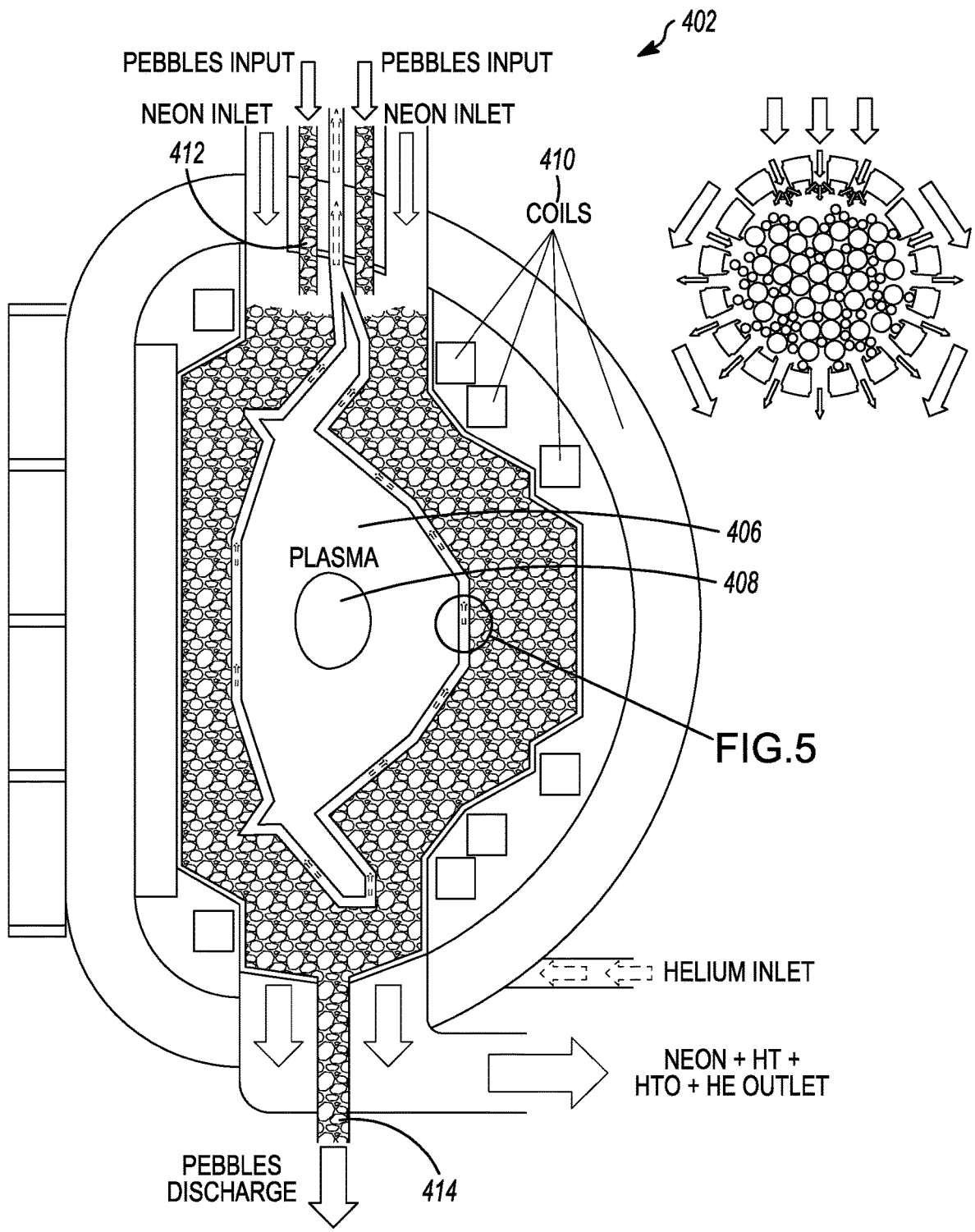
FIG. 4 is a cross-sectional schematic of an exemplary fusion reactor with a nested pebble bed blanket swept by a coolant inert gas (e.g., neon) and rejuvenated by a replenishment system.

FIG. 4 shows a fusion reactor 402 that may have a donut-shaped toroidal vacuum chamber 406 containing the plasma 408. Fusion nuclear reactions happen in the plasma which is confined within the donut-shaped vacuum area by magnetic fields generated by electric currents flow through the coils. The magnetic confinement prevents the fusion plasma from coming into contact with the inner first wall 502 that surrounds the donut-shaped toroidal vacuum chamber 406, preventing the fusion plasma from disrupting the fusion process and melting the first wall 502. In some toroidal chamber reactors 402, radio frequency heating, neutral beam injections, and/or other external heating sources sustain the temperatures required to ignite and sustain nuclear fusion reactions. An exemplary packing and/or an array of a plurality of nested pebbles 100 positioned directly adjacent to each other comprise the nested pebble bed blanket 403 that surrounds a vacuum chamber 406 of the fusion reactor 402. The nested pebble bed blanket 403 is exposed to a neutron flux generated by the fusion plasma 408. In the fusion reactor 402, the neutrons are multiplicated by the neutron multiplier shells 104, such as by beryllide (beryllium-vanadium and/or beryllium-titanium compounds) shells, and interact with the breeder spheroids 102 (e.g., lithium ceramic spheroids), heating the nested pebble bed blanket and generating helium (He), tritium ($^3_1H$ or T), tritiated water (HTO), and in minor quantities, lithium hydroxide LiOH and other elements. The tritiated water (HTO) is in the steam phase, and it is generated by the dissociation of oxygen that recombines with tritium generated by the neutron reactions with the lithium in the ceramic breeder spheroids 102. An inert gas such as neon is pumped by a blower 603 from a top area of reactor 402 and flows downward. It cools the nested pebble bed blanket 403, which is heated by the volumetric heat generated by the neutrons released from the fusion plasma 408 interacting with the nested pebbles 100 in the blanket, and it collects/sweeps the gases generated by the neutrons-breeder spheroids 102 reactions, i.e., helium, tritium, tritiated water and small quantities of other gases. The neon rich new gases flows through the holes in the perforated hoppers 401, and is collected near the bottom of reactor 402.

In some exemplary fusion reactors, the replenishment system enables automatic nested pebble bed blanket rejuvenation through an automatic replenishment system and transfer process managed by a processor and/or controller. The nested pebbles 100 are loaded from the top of reactor 402 by a replenishment system such as an automated conveyor system 412. Spent embedded neutron multiplier shells 104 are exhausted through the hoppers 401. The holes of the perforated hoppers 401 are configured and calibrated to allow neon to pass through to a gas loop while guiding the nested pebbles 100 down to a transfer conveyor system 414 near the bottom of reactor 402. The nested pebble bed blanket 403 is contained and separated from the vacuum chamber by a first wall composed of a sandwich of materials such as a plasma-facing refractory material 502 and a steel material 504 cooled by an inert gas such as helium 506 and a structural ring 400. The steel wall portion 504 is adjacent to an inert gas channel 506.

Figure 5:
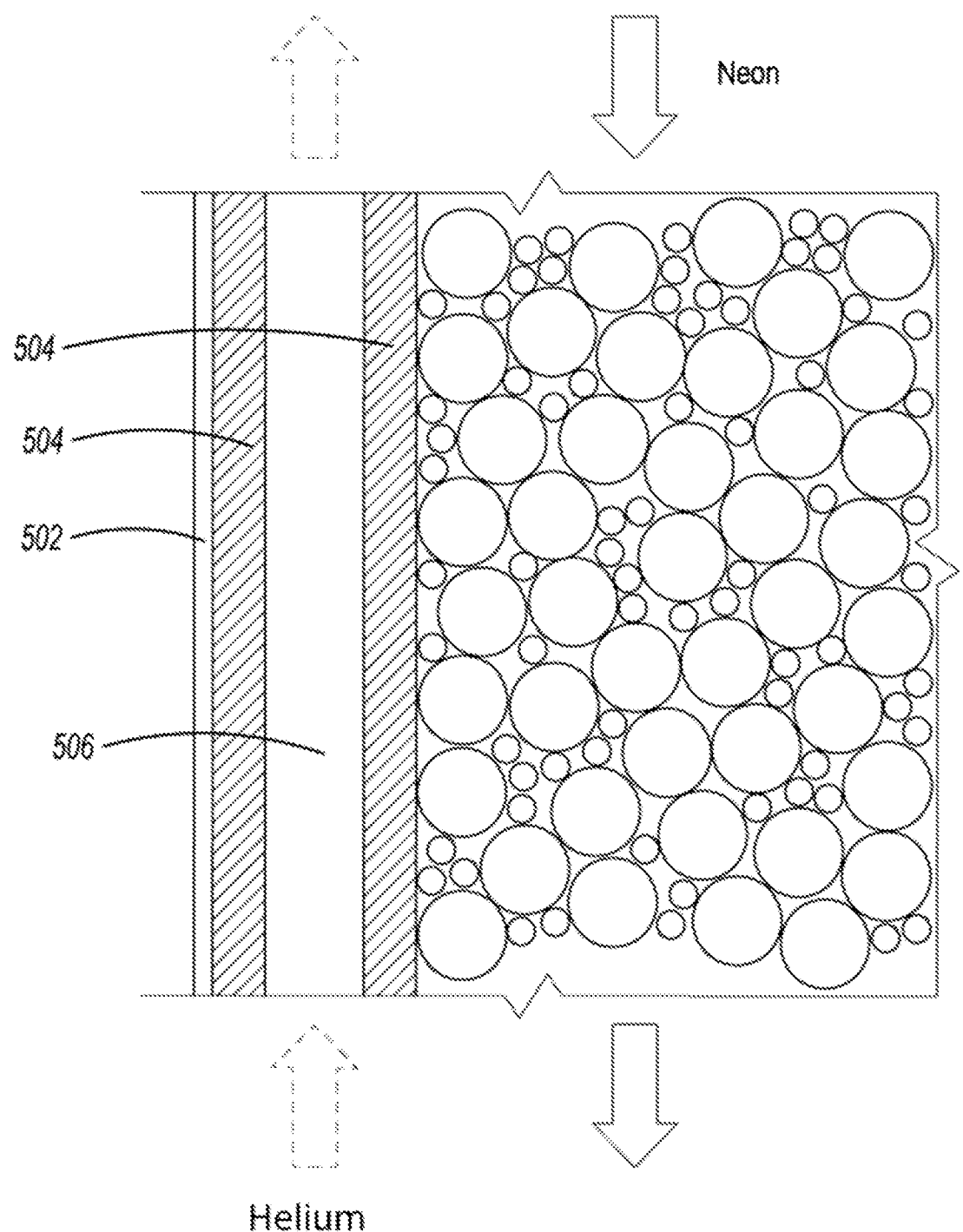
FIG. 5 is an enlarged cross-sectional view of the plasma-facing refractory "first wall", its cooling channel, and part of the blanket.

FIG. 5 shows in detail the first wall that surrounds vacuum area 406 as a first barrier to the hot plasma and contains the nested pebble bed blanket. The first wall is a sandwich of materials e.g., a plasma-facing refractory material 502 and a steel 504 cooled by an inert gas such as helium flowing in cooling channels 506. The refractory material wall may comprise titanium (Ti), zirconium (Zr), and one or two isotopes of molybdenum (e.g., $^{96}$Mo and/or $^{97}$Mo), for example. More specifically, the refractory material wall 502 may comprise titanium-zirconium-molybdenum (TZM) alloy containing a 0.5% titanium element, a 0.08% zirconium element, a 0.02% carbon element, and 99.4% molybdenum isotopes $^{96}$Mo and/or $^{97}$Mo to limit long term radioactive waste. The refractory material wall 502 is adjacent to a steel 504 that conveys thermal energy induced by the fusion plasma to a coolant flow channel 506 that removes that thermal energy. Helium is pumped by the blower 601 from the bottom area of reactor 402 and flows upward in channel 506, cooling the fusion-facing wall 502. It is collected near the top of the reactor 402.

Figure 6:
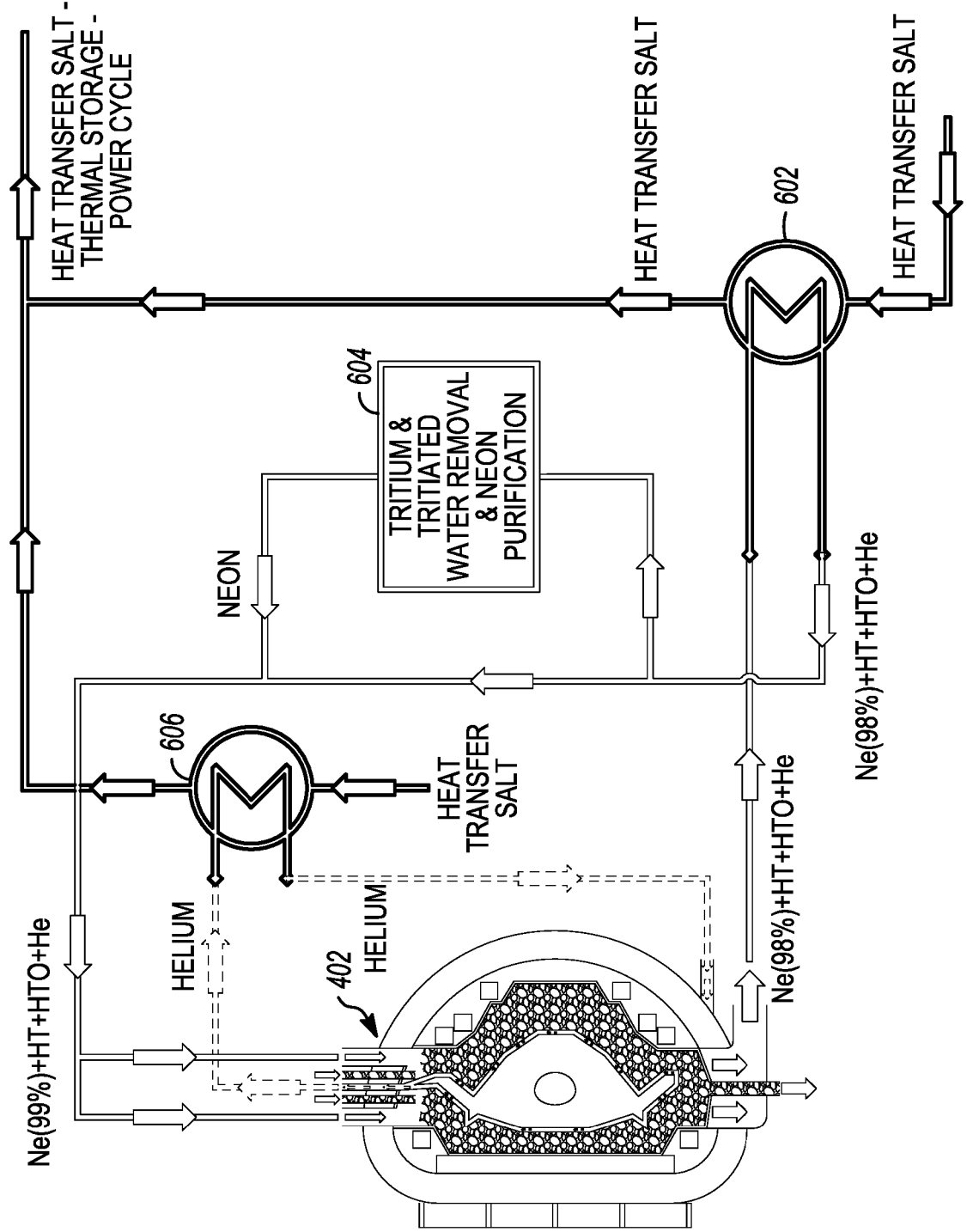
FIG. 6 is a cross-sectional schematic view of the exemplary fusion reactor as in FIG. 4 connected to a thermal-hydraulic system, purifying the blanket coolant (extracting tritium helium, tritiated water, and minor other gases, for example), and transferring energy to a power generating cycle and/or thermal storage based on a molten salt fluid.
Figure 4:
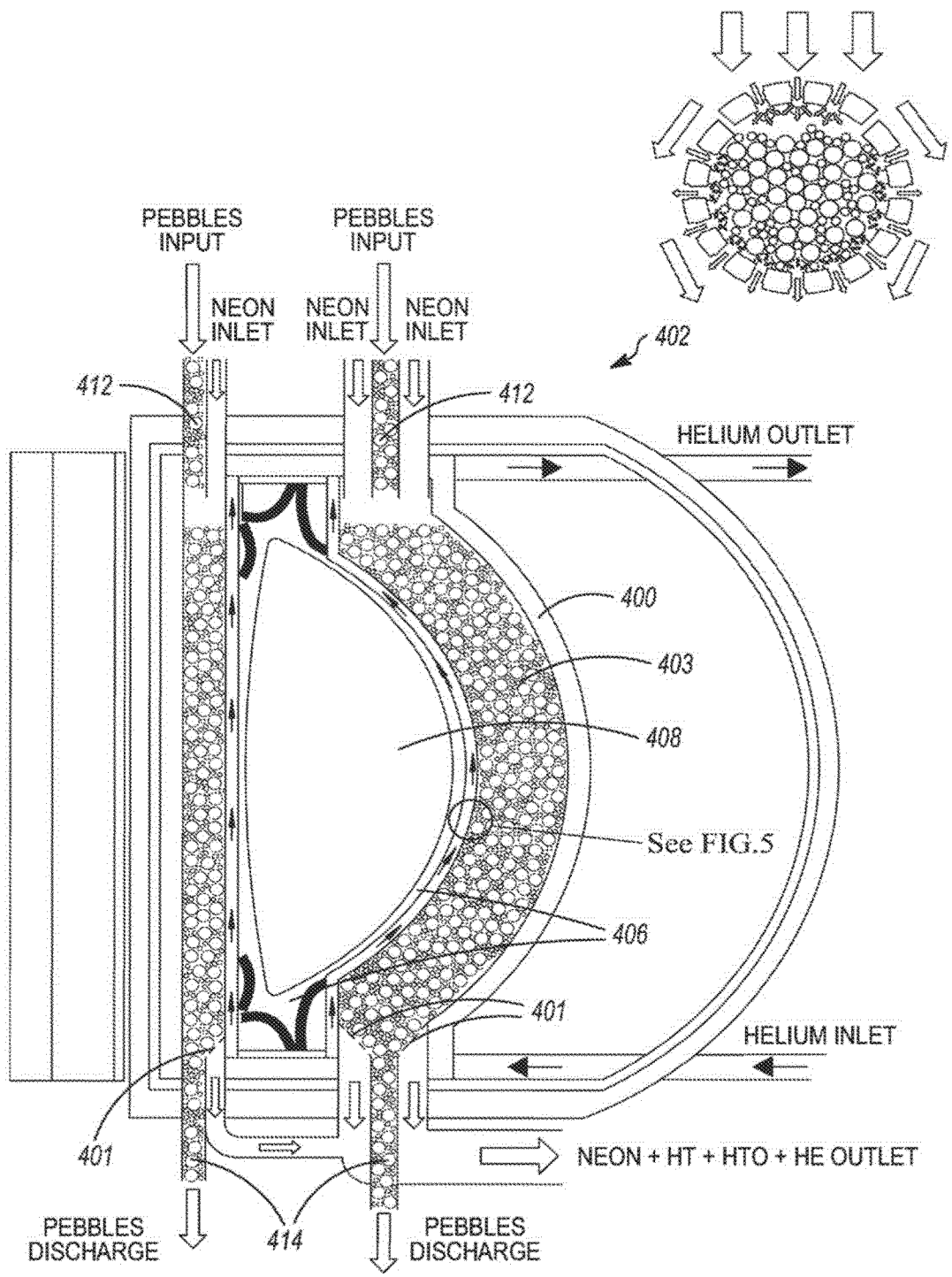
Figure 6:
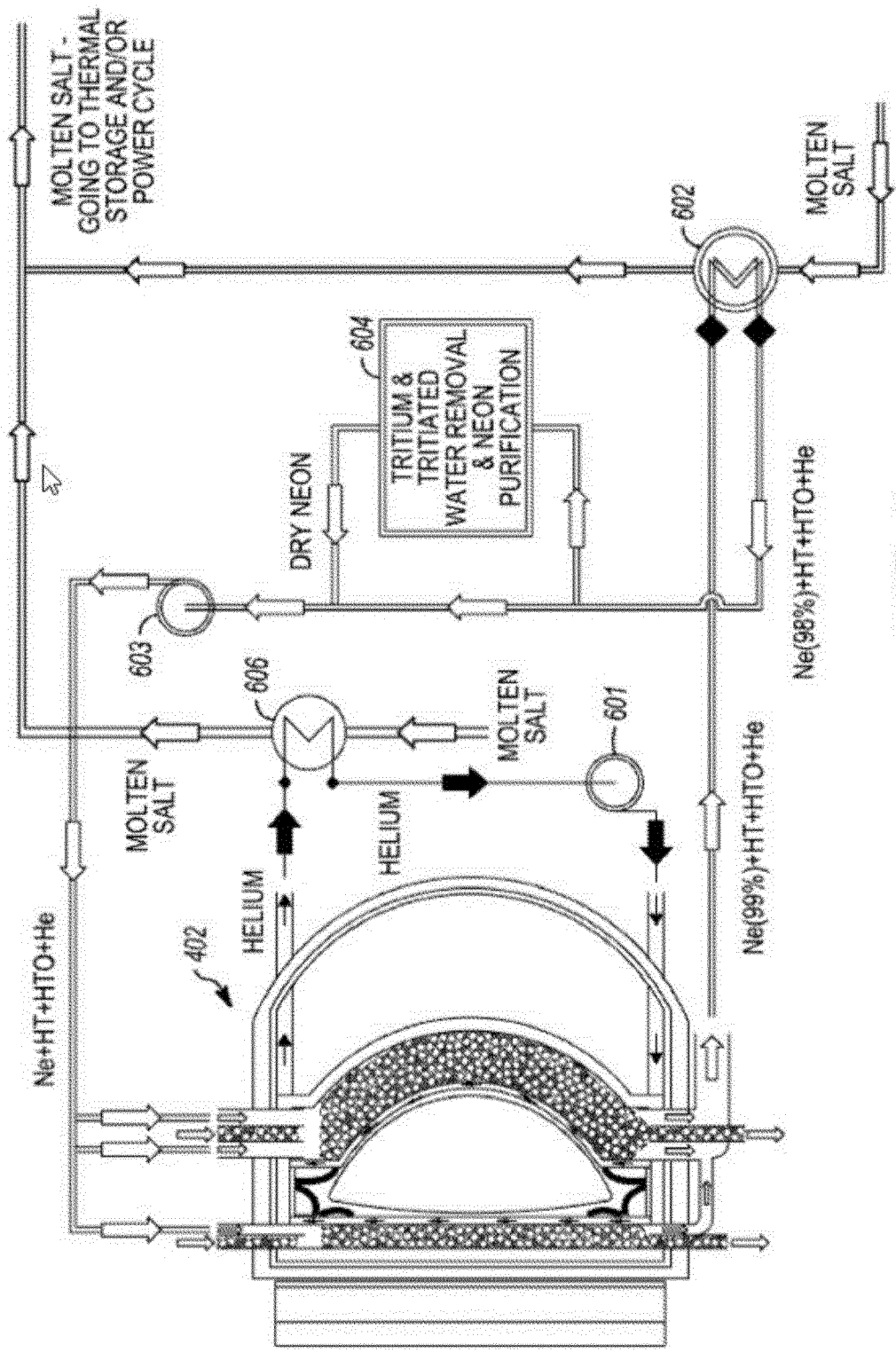

FIG. 6 shows a thermal-hydraulic system for the fusion reactor 402. In operation, neon rich of tritium, tritiated water steam, and helium is discharged near the bottom of reactor 402 and flows to a first heat exchanger 602. The first heat exchanger, 602, transfers the thermal energy (heat) of neon gas to a cooler fluid such as a molten salt (e.g., molten nitrate), which heats up and is then pumped to a thermal storage system and/or a power conversion process or a power generating cycle to generate electricity, for example, or other power. Some power cycles use carbon dioxide ($CO_2$) or water (steam) during the power generating cycle. Also in FIG. 6, the lithium breeding may generate important products for the fusion fuel, e.g., tritium and tritiated water, that are extracted (along with other products and impurities such as helium and lithium hydroxide) from the neon rich of tritium, tritiated water steam, and helium mixture by a separator/purifier 604 and then pumped back into the blanket by the blower 603. In some applications, tritium, tritiated water, and other gas levels must exceed a predetermined concentration in pure neon before an efficient separation occurs. For example, when one percent concentration of tritiated water (HTO), tritiated hydrogen (HT), and helium (He) with respect to the total amount of neon mass is reached, some separator/purifiers 604 may be able to remove most of them from neon by extraction and a purification process or system. In some systems, the purified neon is recirculated back into the neon loop. A second heat exchanger, 606 transfers the thermal energy of the hot helium that cools the reactor's first wall (composed of walls 502 and 504) to a second cooler fluid, which can again be molten salt (e.g., molten nitrite). The cooled helium sometimes referred to as a processed helium is then pumped by the blower 601 into reactor 402 to continue cooling the first wall 502 through the coolant channel 506, while the molten salt carries the thermal energy to a thermal storage system and/or to a power cycle that produces electricity.

Detailed Description of the Design Choices

A way to increase the tritium breeding ratio is to maximize the lithium content, making the breeder spheroids 102 and the neutron multiplier shell 104 (collectively referred to as nested pebbles 100) spherical and binary-sized. A sphere size ratio (SR) of 3 and a Volume Fraction of the Large sphere (VFL) of 0.7 increases the solid random packing fraction (fraction of the total sphere volume versus available volume) from 0.64 (single size spheres) to 0.71. Higher size ratio spheres have higher random packing fractions. For example, a sphere size ratio of 5 allows a maximum packing fraction of about 0.76.

In the exemplary use case of 3:1 diameter ratios in the binary-sized breeder spheres 102, the large spheres may have a diameter of 2.4 mm, and the small spheres may have a diameter of about 0.8 mm, respectively. The inner perforations (holes) 112 of the flow distributors 110 in the multiplier spherical shell 104 would have a diameter of less than 0.8 mm (e.g., 0.7 mm) to retain the small breeder sphere 102 within the neutron multiplier spherical shell's 104 inner volume. The perforations (holes) 106 (that lead the flow to the flow distributors 110) of the exemplary neutron multiplier shell 104 may have a diameter of less than 2.4 mm, which retain the large exemplary breeder spheres 102 in the multiplier shells 104 in case of a rupture of a flow distributor 110. In the exemplary use case of 3:1 diameter ratios in the binary-sized multiplier spherical shells 104, the large spherical shell may have a diameter of about 6 cm, and the small one has a diameter of about 2 cm. When the volume fraction of large breeding spheres and multiplier spherical shells (VFL) is 0.7, and the size ratio (SR) is 3, there are eleven times the small breeder spheres 102 and small neutron multiplier spherical shells 104, respectively, than the large breeder spheres 102 and the large neutron multiplier spherical shells 104, respectively. Further, the spherical shape of the beryllium (beryllide) neutron multiplier shells 104 encasing lithium breeder spheroids 102 facilitate neutron backscattering inside the shell. Alternative single-size shapes of spheroids 102 and shells 104, such as ellipsoids with axes ratios near 1.25:1:0.8 or other shapes, can be envisaged so that the packing fraction (of lithium ceramics spheres 102 and/or nested pebbles) is still higher than 0.6 and avoiding the use of flow distributors.

Further, when the binary-sized breeder spheres 102 comprise lithium oxide ($Li_2O$) and the neutron multiplier binary-sized spherical shells 104 comprise a beryllide compound with a shell thickness of about 1 mm, the nested pebble bed blanket's 403 overall lithium content is about 0.42 g/cm$^3$, which is greater than prior art molten salt blankets, comprising a mixture lithium fluoride (LiF) and beryllium fluoride ($BeF_2$) called FLiBe, of about 27 g/cm$^3$. Lithium oxide ($Li_2O$) has higher lithium atom density compared to other lithium compositions (0.93 g/cm$^3$ vs 0.54 g/cm$^3$ in lithium orthosilicate $Li_4SiO_4$, for example); notably, the overall lithium content of the nested pebble bed blanket 403 approaches pure liquid lithium blankets of 0.45 g/cm$^3$, which is lower than the pure liquid lithium density of 0.51 g/cm$^3$ because of steel structures. However, Pure liquid lithium may not be used in large quantities due to its reactivity (flammability) with air, moisture, and water, corrosiveness with steels, and chemical toxicity.

Nested pebbles 100 made of binary-sized (3:1 ratio) lithium oxide ($Li_2O$) breeder spheres 102 included in beryllide compound neutron multiplier spherical shells 104 achieve a tritium breeding ratio exceeding 1.2 in some applications. This tritium breeding ratio is realized using a natural lithium composition in the breeder spheres 102, i.e., 7.5% Lithium-6 and 92.5% Lithium-7. This is in contrast to conventional reactor blankets that use up to about 90% enrichment in Lithium-6 to attain a comparable tritium breeding ratio. Lithium oxide ($Li_2O$) also has a strong thermal conductivity (3 W/(mK)), and the breeder spheroids 102 made of lithium oxide ($Li_2O$) function at a high-temperature operational range (400° C.-600° C.).

The use of a fast-sweeping neon coolant that comprises substantially no helium content enables more efficient extraction of the helium produced by fusion reactions because of its speed and absence of limiting diffusion resistance in comparison to using a low-speed helium-sweeping gas (as used in some fusion reactor blankets), reducing the lithium oxide breeder spheroid 102 swelling and so preserving their integrity. Further, neon has the best thermal properties as a gas after hydrogen and helium, i.e., it has high thermal conductivity, heat capacity, and low viscosity. Additionally, neon is an inert gas, so it remains unreactive with lithium oxide at all temperatures. In contrast, common coolant gases such as carbon dioxide ($CO_2$) and nitrogen ($N_2$) react with lithium oxide ($Li_2O$), forming lithium carbonate ($Li_2CO_3$) plus oxygen and lithium nitride ($Li_3N$) plus oxygen, respectively. Inert gases different from neon may be used in alternative reactors, such as argon (Ar), for example. Due to its inert nature, it is also non-reactive with lithium compounds, it is more abundant than neon, and it is stable but has inferior thermal properties.

Production of the corrosive lithium hydroxide (LiOH(T)) is kept at low levels by the fusion reactor's separator/purifier 604, where lithium hydroxide (LiOH(T)) is extracted (along with tritiated hydrogen (HT), helium (He), and tritiated water (HTO)). Further, the beryllide neutron multiplier shells 104 resist oxidation, making it resistant to the lithium hydroxide (LiOH(T)) induced corrosion.

In the use case, beryllium (beryllide compound Be—V and/or Be—Ti) is used in the neutron multiplier shells 104 because of its low energy threshold (e.g., 1.86 MeV) for (n,2n) neutron multiplication. A (n,2n) reaction represents a neutron-induced reaction when a neutron collides with a target nucleus, ejecting the two neutrons. Further, beryllium has a very low neutron absorption, has a high melting point (1287° C.), is lightweight, resists indentation, scratching, and abrasion (e.g., it is stiff), is a good thermal conductor, is non-magnetic. Beryllide compounds share all the beryllium properties, but in contrast to pure beryllium, they have the added advantage of not deforming meaningfully because of their desorption properties of helium and tritium gases generated by neutron irradiation. Comparatively, beryllide has a density thirty percent lower than aluminum and a stiffness three times greater than titanium. As a consequence, the nested pebbles 100 can be made of very light materials, e.g., beryllide (Be—V and/or Be—Ti) and a lithium ceramic ($Li_2O$), resulting in a small gravity load in the blanket's nested pebble staking and the disclosed beryllide neutron multiplier shells 104 do not need steel structures to maintain their structural integrity, maximizing the nested pebble bed blanket's tritium breeding ratio; further the thinner are the shells (e.g., ST=(outer diameter (OD)−inner diameter(ID))/2) the higher is the tritium breeding ratio.

The stacking and the geometry of nested pebbles 100 facilitate automatic and continuous replacement that may be based on a reactor's tritium breeding efficiency. When a surface coating material, such as titanium nitride (TiN), is applied to the nested pebbles, the coefficient of friction among the nested pebbles is reduced from 0.5 (beryllium-beryllium) to 0.11 (titanium nitride-titanium nitride), facilitating the nested pebble's movements during the recharging and unloading. Further, such coating eliminates the health risks associated with beryllium (beryllide) powder generated from the nested pebbles "rubbing" with each other in their movements, including the potential for respiratory illness and skin disease.

In the fusion reactor 402 shown in the cross-section in FIG. 4, typically one-third of the heat produced by the fusion reaction may be transferred to the first-wall 502 (by plasma irradiation and charged particles—surface heating) while two-thirds of the heat may be transferred to the blanket, i.e., the nested pebble bed blanket heated by volumetric heating induced by the neutron flux-pebbles interaction. The fusion reactor's helium coolant dissipates heat from the first wall efficiently through its heat transfer properties (high thermal conductivity, high heat capacity, and low viscosity), and its ability to operate at high temperatures without becoming reactive with any material; the refractory material 502 that serves as the plasma-facing wall 502 comprises titanium (Ti), zirconium (Zr), or TZM because of its outstanding physical properties comparable to tungsten. Molybdenum, though, has a much lower atomic mass, generating substantially higher radiative power losses. The −96 and −97 isotopes of molybdenum (e.g., $^{96}Mo$ and/or $^{97}Mo$) are chosen to avoid long-term radioactive waste.

Tungsten has been used typically for first-wall in fusion reactors, and a comparison of the two is shown in Table 1.

TABLE 1

A comparison of Tungsten (W) and TZM (Ti-Zr-$^{96}$Mo-$^{97}$Mo)

| Property | Tungsten (W) | TZM (Ti-Zr-$^{96}$Mo-$^{97}$Mo) |
|---|---|---|
| Melting point | 3422° C. | 2623° C. |
| | Tungsten is more resistant to the extremely high temperatures found in fusion reactors. | |
| Thermal conductivity | 170 W/mK | 118 W/mK |
| | Tungsten transfers heat more effectively than molybdenumf rom plasma-facing surfaces. | |
| Sputtering Yield | Similar | |
| Hydrogen retention | W lower than TZM | |
| | TZM's higher hydrogen retention may degrade plasma performance more than tungsten. | |
| Long-term neutron activation | W has a lower long-term activation than TZM but when TZM is enriched with isotopes -96 and -97, its long-lived radioisotopes are dramatically reduced. | |
| Mechanical properties | W is more brittle than TZM. | |
| | Flexibility (less brittle) is preferred to accommodate thermal and mechanical stresses. | |
| Density | 19.25 g/cm$^3$ | 10.16 g/cm$^3$ |
| | TZM is much lighter than tungsten; this helps structurally. | |
| Atomic mass (Z) number | 74 | 42 |
| | Tungsten has a much higher atomic mass than TZM, with the chance of generating substantially higher radiative power losses. | |

The titanium-zirconium-molybdenum alloy comprises a molybdenum alloy containing 0.5% titanium, 0.08% zirconium, 0.02% carbon with the balance (99.4%) molybdenum −96 and −97. The alloy reduces the likelihood that the plasma facing wall 502 becomes brittle at high temperatures (TZM has a higher recrystallization temperature than pure molybdenum). Moreover, titanium-zirconium-molybdenum behaves much like tungsten, with up to fifty displacements per atom and with high strength, hardness, creep resistance, and ductility, and without any disadvantages of Tungsten, as shown in Table 1.

The molten salt in FIG. 6 may comprise a molten nitrate salt combination by mass of 43% potassium nitrate ($KNO_3$), 40% sodium nitrate ($NaNO_2$), and 7% sodium nitrate ($NaNO_3$) that possesses a low melting point (142° C.), a high boiling point (593° C.), it is not corrosive, exhibits insensitivity to radiation damage, does not undergo reactions with lithium oxide ($Li_2O$), has high thermal conductivity, and is liquid at atmospheric pressure. This type of molten salts (e.g., molten nitrates) are preferable for thermal storage applications or as an intermediate fluid to insulate neon from water. In systems that adjust the electricity generation to match changes in demand for power (e.g., load-follow generation), thermal storage allows an easy change of electric output from the fusion power plant. Further, thermal storage provides the necessary thermal inertia to balance the discontinuous power production in some fusion reactors. In some applications, the heat transfer salt is maintained at an atmospheric pressure (0.1 MPa), while the neon and helium coolants are pressurized at 8 Mpa. Thus, should a heat exchange element rupture (e.g., a tube shell), the neon and helium circulating in the fusion reactor will discharge into the molten salt, impeding their contamination with the molten salt.

The disclosed nested pebble bed blanket has high thermal efficiency, excellent tritium breeding, and shields the components that contain plasma. The nested pebble bed blanket sustains tritium breeding ratios greater than 1.2 using a natural lithium isotopic composition and has a maximum coolant temperature of 550° C. using inert gases (helium, neon or argon) and molten nitrates that are not corrosive. The nested pebble bed blanket is unaffected by disruptive magnetohydrodynamics effects because the blanket does not rely on liquid metal coolants and/or breeders. Because the lithium spheroids are kept insulated from water, the system prevents unintended lithium-water reactions that may create fire hazards and/or degrade the tritium breeding. The nested pebbles 100 made of breeder spheroids 102 and neutron multiplier shell 104 replacements within the exemplary nested pebble bed blankets are loaded and exhausted by a continuous replenishment, i.e., the loading and unloading process and system.

The nested pebble bed blanket that renders the disclosed functions herein may be practiced in the absence of any disclosed or expressed element (including all the properties and/or the functionality expressed), and in the absence of some or all of the described properties and functions associated with a component or structure that are expressly described. The systems may operate in the absence of one or more of these components, process steps, elements and/or any subset of the expressed functions. Further, the systems may function with additional or substitute elements and functionality. For example, the breeder spheroids 102 and the neutron multiplier shells 104 may comprise other materials and sized by other ratios and not be restricted to two sizes, respectively, just as other coolants and cooling systems may be used to cool the nested pebble blanket 403 and fusion reactor 402.

Further, the various elements, system components, and process steps described in each system and process described herein are regarded as divisible concerning the individual elements described rather than inseparable as a whole. In other words, alternate systems encompass any variation and combinations of elements, components, and process steps described herein and may be made, used, or executed without the various elements described (e.g., they may operate in the absence of) including some or all of those disclosed in the prior art but not expressed in the disclosure herein. Thus, some systems do not include those disclosed in the prior art, including those not described herein, and thus are described as not being part of those systems and/or components, thus rendering alternative systems that may be claimed as systems and/or methods excluding those elements and/or steps.

In this disclosure, the term "controller" refers to a processor or a portion of a program that determines how the programmed device manages the rejuvenation of the nested pebble bed blanket. A controller includes or interfaces sensors that track the state of the nested pebble bed blanket. The term "substantially" or "about" encompasses a range that is largely, in some instances, but not necessarily wholly, that which is specified. It encompasses all but a significant amount, such as what is specified or within five to ten percent. In other words, the terms "substantially" or "about" means equal to or at or within five to ten percent of the expressed value. The term "real-time" and "real time" refer to responding to an event as it occurs, such as conveying replacement nested pebbles 100 to a reactor 402 through a rejuvenation processes due to the state of a reaction or condition of the nested pebble blanket within the reactor 402. Real time operations are those operations that match external activities and proceed at the same rate (e.g., without delay) or faster than that rate of the activities and/or process. Some real-time control systems operate at a faster rate than the physical element it is controlling. The term communication, in communication with, and versions of the term are intended to broadly encompass both direct and indirect connections.

The subject matter of the disclosure may also relate, among others, to the following aspects (referenced by numbers):

Aspect 1. A nested pebble 100 comprising:
a neutron multiplier shell 104 having a plurality of perforations 106 passing through an inner surface and an outer surface of the neutron multiplier shell 104;
a plurality of perforated flow distributor elements 110 in one-to-one correspondence with the perforations 106, the perforated flow distributor elements 110 fastened to the inner surface of the neutron multiplier shell 104 in line with the respective perforations 106 to let coolant flow from outside the neutron multiplier shell 104 to its inner volume; and
a plurality of breeder spheroids 102 encased within the neutron multiplier shell 104.

Aspect 2. The nested pebble of aspect 1, where the plurality of breeder spheroids 102 produce, when bombarded by neutrons, fusion fuel and a plurality of derivatives that sustain nuclear fusion reactions.

Aspect 3. The nested pebble of aspect 1 or 2, wherein the plurality of breeder spheroids 102 comprise lithium ceramics made of a lithium oxide ($Li_2O$), a lithium orthosilicate ($Li_4SiO_4$), and/or lithium metatitanate ($Li_2TiO_3$).

Aspect 4. The nested pebble of any one of aspects 1 to 3, where the neutron multiplier shell 104 comprises beryllium or a beryllide compound that includes beryllium-vanadium and/or beryllium-titanium.

Aspect 5. The nested pebble of any one of aspects 1 to 4, where the perforated flow distributor elements 110 comprise beryllium or a beryllide compound that includes beryllium-vanadium and/or beryllium-titanium.

Aspect 6. The nested pebble of any one of aspects 1 to 5, where the outer surface of the neutron multiplier shell 104 comprises a harder and/or lower friction material than a beryllium compound.

Aspect 7. The nested pebble of aspect 6, where the harder and lower friction material comprises titanium nitride (TiN).

Aspect 8. The nested pebble of any one of aspects 1 to 7, where one or more of the perforated flow distributor elements 110 have circular perforations.

Aspect 9. The nested pebble of any one of aspects 1 to 7, where one or more of the perforated flow distributor elements 110 have a honeycomb shape.

Aspect 10. The nested pebble of any one of aspects 1 to 9, where one or more of the perforated flow distributor elements 110 have a hemispherical shape.

Aspect 11. The nested pebble of any one of aspects 1 to 10, where the neutron multiplier shell 104
has a gap 108 that provides access to its inner volume, and
comprises a hatch 105 mechanically coupled to the neutron multiplier shell 104 to movably close or open the gap 108.

Aspect 12. The nested pebble of any one of aspects 1 to 11, where the neutron multiplier shell 104 has circular perforations 106.

Aspect 13. The nested pebble of any one of aspects 1 to 12, where the plurality of breeder spheroids 102 have a spherical shape having a plurality of diameters.

Aspect 14. The nested pebble of aspect 13, where the plurality of breeder spheroids 102 comprises a plurality of groups of spheres, where the spheres of each group have a respective unique diameter.

Aspect 15. The nested pebble of aspect 14, where a first group of spheres have a first diameter and a second group of spheres have a second diameter.

Aspect 16. The nested pebble of aspect 15 where, the first diameter is at least three times larger than the second diameter.

Aspect 17. The nested pebble of any one of aspects 1 to 12, where the plurality of breeder spheroids 102 have an ellipsoidal shape.

Aspect 18. The nested pebble of aspect 17 where the ellipsoidal shape has axes ratios of about 1.25:1:0.8.

Aspect 19. A nested pebble blanket 403 for surrounding a vacuum chamber 406 of a fusion reactor 402, the nested pebble blanket comprising:
 a plurality of nested pebbles like the nested pebble 100 of any one of aspects 1 to 18.

Aspect 20. The nested pebble blanket of aspect 19, where the plurality of nested pebbles 100 comprise corresponding neutron multiplier shells 104 that have a spherical shape having a plurality of diameters.

Aspect 21. The nested pebble blanket of aspect 20, where the plurality of nested pebbles 100 comprise a plurality of groups of nested pebbles, where the nested pebbles of each group comprise corresponding spherical neutron multiplier shells 104 having a respective unique diameter.

Aspect 22. The nested pebble blanket of aspect 21, where a first group of nested pebbles have corresponding spherical neutron multiplier shells 104 having a first diameter and a second group of nested pebbles have corresponding spherical neutron multiplier shells 104 having a second diameter.

Aspect 23. The nested pebble blanket of aspect 22, where the first diameter is at least three times larger than the second diameter.

Aspect 24. The nested pebble blanket of aspect 19, where the plurality of nested pebbles 100 comprise corresponding neutron multiplier shells 104 that have an ellipsoidal shape.

Aspect 25. The nested pebble blanket of aspect 24, where the ellipsoidal shape has axes ratios of about 1.25:1:0.8.

Aspect 26. The nested pebble blanket of any one of aspects 19 to 25, where the nested pebbles 100 are packed directly adjacent to each other.

Aspect 27. The nested pebble blanket of any of aspects 19 to 26, where the nested pebbles 100 are arranged and configured to enable a first inert gas to
 flow through the perforated flow distributor elements 110 disposed within the neutron multiplier shells 104 and around the breeder spheroids 102 to cool the nested pebble blanket 403, and
 sweep at least helium, tritium, and tritiated water steam from the breeder spheroids 102.

Aspect 28. The nested pebble blanket of aspect 27, where the first inert gas comprises neon or argon or both.

Aspect 29. A fusion reactor 402, comprising:
 a first wall that encloses a vacuum chamber 406 for containing a magnetically controlled plasma 408 capable of sustaining a plurality of fusion reactions, where the first wall comprises a refractory material 502 that forms an inner portion of the first wall and steel 504 that forms the outer portion of the first wall, where the steel 504 has channels 506 for circulating a second inert gas through the first wall;
 a structural ring 400 that encloses the first wall; and
 the nested pebble blanket 403 of any one of aspects 19-28, where the nested pebble blanket 403 is sandwiched between the first wall and the structural ring 400.

Aspect 30. The fusion reactor of aspect 29, where the refractory material 502 includes two or more isotopes of molybdenum $^{96}$Mo or $^{97}$Mo.

Aspect 31. The fusion reactor of aspect 30, where the refractory material comprises Titanium-Molybdenum-Zirconium alloy.

Aspect 32. The fusion reactor of any one of aspects 29-31, where the second inert gas comprises helium.

Aspect 33. The fusion reactor of any one of aspects 29 to 32 further comprising
 a first conveyor 412 that couples a drive system to the nested pebble blanket 403 to automatically convey one or more nested pebbles 100 to the nested pebble blanket 403;
 a second conveyor 414; and
 a plurality of hoppers 401 coupled through the second conveyor 414 to a second drive system to convey one or more nested pebbles 100 from the nested pebble blanket 403.

Aspect 34. The fusion reactor of aspect 33, where the hoppers 401 are perforated and arranged to redirect the first inert gas through a gas loop different from a pebbles loop.

Aspect 35. A thermal-hydraulic system comprising:
 the fusion reactor 402 of any one of aspects 29-34;
 a first fluid loop that circulates the second inert gas through the channels 506 of the first wall of the fusion reactor 402 for cooling the first wall;
 a second fluid loop that circulates the first inert gas through the nested pebbled blanket 403 of the fusion reactor 402 for cooling the nested pebbled blanket 403 and sweeping of at least the tritium, tritiated water, and helium;
 a third fluid loop thermally coupled with the first fluid loop and the second fluid loop, where the third fluid loop
 removes heat from the first and second fluid loops, and
 transfers at least a portion of energy corresponding to the removed heat to a thermal energy storage and/or a power loop that uses water steam, carbon dioxide, or other fluids to generate electricity.

Aspect 36. The thermal-hydraulic system of aspect 35, where the third loop uses molten salt.

Aspect 37. The thermal-hydraulic system of aspect 36, where the molten salt comprises molten nitrite.

Aspect 38. The thermal-hydraulic system of any one of aspects 36 to 37, further comprising a heat exchanger 606 that
 transfers thermal energy captured by the second inert gas in the first fluid loop to molten salt in the third fluid loop to cool the second inert gas, and
 causes the cooled second inert gas to return to the fusion reactor's 402 cooling channels 506.

Aspect 39. The thermal-hydraulic system of any one of aspects 36 to 38 further comprising a second heat exchanger 602 that
 transfers thermal energy captured by the first inert gas in the second loop to molten salt in the third fluid loop to cool the first inert gas, and
 causes the cooled first inert gas to return to the fusion reactor's 402 nested pebble blanket 403.

Aspect 40. The thermal-hydraulic system of any one of aspects 35 to 39 further comprising a separator/purifier 604 thermally coupled to the second fluid loop and configured to
   purify the first inert gas by extracting a portion of the tritium, the tritiated, water steam, helium, and impurities swept by the first inert gas from the plurality of breeder spheroids 102 within the nested pebble blanket 403, and
   return the purified first inert gas to the nested pebble blanket 403.

Aspect 41. The thermal-hydraulic system of any one of aspects 35 to 40 further comprising
   a first blower 601 that circulates the first loop's second inert gas through the channels 506 of the first wall.

Aspect 42. The thermal-hydraulic system of any one of aspects 35 to 41 further comprising
   a second blower 603 that circulates the second loop's first inert gas through the nested pebble blanket 403.

Other systems, methods, features, and advantages will be, or will become, apparent to one with skill in the art upon examination of the figures and detailed description. It is intended that all such additional systems, methods, features, and advantages be included within this description, be within the scope of the disclosure, and be protected by the following claims.

The invention claimed is:

1. A nested pebble comprising:
   a neutron multiplier shell having a plurality of perforations passing through an inner surface and an outer surface of the neutron multiplier shell;
   a plurality of perforated flow distributor elements in one-to-one correspondence with the perforations, the perforated flow distributor elements fastened to the inner surface of the neutron multiplier shell in line with the respective perforations to let coolant flow from outside the neutron multiplier shell to its inner volume; and
   a plurality of breeder spheroids encased within the neutron multiplier shell.

2. The nested pebble of claim 1, where the neutron multiplier shell comprises beryllium or a beryllide compound that includes beryllium-vanadium and/or beryllium-titanium.

3. The nested pebble of claim 1, where the outer surface of the neutron multiplier shell comprises a harder and/or lower friction material than a beryllium compound.

4. The nested pebble of claim 1, where the neutron multiplier shell has circular perforations.

5. The nested pebble of claim 1, where the neutron multiplier shell
   has a gap that provides access to its inner volume, and
   comprises a hatch mechanically coupled to the neutron multiplier shell to movably close or open the gap.

6. The nested pebble of claim 1, where the perforated flow distributor elements comprise beryllium or a beryllide compound that includes beryllium-vanadium and/or beryllium-titanium.

7. The nested pebble of claim 1, where one or more of the perforated flow distributor elements have hexagonal perforations.

8. The nested pebble of claim 1, where one or more of the perforated flow distributor elements have a hemispherical shape.

9. The nested pebble of claim 1, wherein the plurality of breeder spheroids comprise lithium ceramics made of a lithium oxide $Li_2O$, a lithium orthosilicate $Li_4SiO_4$, and/or lithium metatitanate $LizTiO_3$.

10. The nested pebble of claim 1, where the plurality of breeder spheroids have a spherical shape having a plurality of diameters.

11. The nested pebble of claim 10, where the plurality of breeder spheroids comprises a plurality of groups of spheres, where the spheres of each group have a respective unique diameter.

12. The nested pebble of claim 11, where a first group of spheres have a first diameter and a second group of spheres have a second diameter.

13. The nested pebble of claim 12, where the first diameter is at least three times larger than the second diameter.

14. The nested pebble of claim 1, where the plurality of breeder spheroids have an ellipsoidal shape.

15. The nested pebble of claim 1, where the plurality of breeder spheroids produce, when bombarded by neutrons, fusion fuel and a plurality of derivatives that sustain nuclear fusion reactions.

16. A nested pebble blanket for surrounding a vacuum chamber of a fusion reactor, the nested pebble blanket comprising:
   a plurality of nested pebbles packed directly adjacent to each other,
   where each nested pebble comprises
      a neutron multiplier shell having a plurality of perforations passing through an inner surface and an outer surface of the neutron multiplier shell;
      a plurality of perforated flow distributor elements in one-to-one correspondence with the perforations, the perforated flow distributor elements fastened to the inner surface of the neutron multiplier shell in line with the respective perforations to let coolant flow from outside the neutron multiplier shell to its inner volume; and
      a plurality of breeder spheroids encased within the neutron multiplier shell.

17. The nested pebble blanket of claim 16, where the plurality of nested pebbles comprise corresponding neutron multiplier shells that have a spherical shape having a plurality of diameters.

18. The nested pebble blanket of claim 17, where the plurality of nested pebbles comprise a plurality of groups of nested pebbles, where the nested pebbles of each group comprise corresponding spherical neutron multiplier shells having a respective unique diameter.

19. The nested pebble blanket of claim 18, where a first group of nested pebbles have corresponding spherical neutron multiplier shells having a first diameter and a second group of nested pebbles have corresponding spherical neutron multiplier shells having a second diameter.

20. The nested pebble blanket of claim 19, where the first diameter is at least three times larger than the second diameter.

21. The nested pebble blanket of claim 16, where the plurality of nested pebbles comprise corresponding neutron multiplier shells that have an ellipsoidal shape.

22. The nested pebble blanket of claim 16, where the nested pebbles are arranged and configured to enable a first inert gas to flow through the perforated flow distributor elements disposed within the neutron multiplier shells and around the breeder spheroids to cool the nested pebble blanket, and sweep out at least helium, tritium, and tritiated water steam from the breeder spheroids.

23. The nested pebble blanket of claim 22, where the first inert gas comprises neon or argon or both.

24. A fusion reactor comprising:
a first wall that encloses a vacuum chamber for containing a magnetically controlled plasma capable of sustaining a plurality of fusion reactions,
  where the first wall comprises
    a refractory material that forms an inner portion of the first wall and steel that forms an outer portion of the first wall,
      where the steel has channels for circulating a first inert gas through the first wall;
a structural ring that encloses the first wall; and
a nested pebble blanket sandwiched between the first wall and the structural ring, where the nested pebble blanket comprises
  a plurality of nested pebbles packed directly adjacent to each other, where each nested pebble comprises
    a neutron multiplier shell having a plurality of perforations passing through an inner surface and an outer surface of the neutron multiplier shell;
    a plurality of perforated flow distributor elements in one-to-one correspondence with the perforations,
      the perforated flow distributor elements
        fastened to the inner surface of the neutron multiplier shell in line with the respective perforations
        to let coolant flow from outside the neutron multiplier shell to its inner volume; and
    a plurality of breeder spheroids encased within the neutron multiplier shell.

25. The fusion reactor of claim 24, where the refractory material includes two or more isotopes of molybdenum $^{96}$Mo or $^{97}$Mo.

26. The fusion reactor of claim 24, where the first inert gas comprises helium.

27. The fusion reactor of claim 24, further comprising:
a first conveyor that couples a drive system to the nested pebble blanket to automatically convey one or more nested pebbles to the nested pebble blanket;
a second conveyor; and
a plurality of hoppers coupled through the second conveyor to a second drive system to convey one or more nested pebbles from the nested pebble blanket,
  where the hoppers are perforated and arranged to redirect a second inert gas through a gas loop different from a pebbles loop.

28. A thermal-hydraulic system comprising:
(i) a fusion reactor that includes
  a first wall that encloses a vacuum chamber for containing a magnetically controlled plasma capable of sustaining a plurality of fusion reactions,
    where the first wall comprises
      a refractory material that forms an inner portion of the first wall and
      steel that forms an outer portion of the first wall,
        where the steel has channels for circulating a first inert gas through the first wall;
  a structural ring that encloses the first wall; and
  a nested pebble blanket sandwiched between the first wall and the structural ring, where the nested pebble blanket comprises
    a plurality of nested pebbles packed directly adjacent to each other, where each nested pebble comprises
      a neutron multiplier shell having a plurality of perforations passing through an inner surface and an outer surface of the neutron multiplier shell;
      a plurality of perforated flow distributor elements in one-to-one correspondence with the perforations,
        the perforated flow distributor elements fastened to the inner surface of the neutron multiplier shell in line with the respective perforations
        to let coolant flow from outside the neutron multiplier shell to its inner volume; and
      a plurality of breeder spheroids encased within the neutron multiplier shell;
(ii) a first fluid loop that circulates the first inert gas through the channels of the first wall of the fusion reactor for cooling the first wall;
(iii) a second fluid loop that circulates a second inert gas through the nested pebbled bed blanket of the fusion reactor for
  cooling the nested pebbled blanket
  and sweeping out at least tritium, tritiated water, and helium; and
(iv) a third fluid loop thermally coupled with the first fluid loop and the second fluid loop, where the third fluid loop
  removes heat from the first and second fluid loops, and
  transfers at least a portion of energy corresponding to the removed heat to
    a thermal energy storage
    and/or a power loop that uses water steam, carbon dioxide, or other fluids to generate electricity.

29. The thermal-hydraulic system of claim 28, where the third loop uses molten salt.

30. The thermal-hydraulic system of claim 28, further comprising
a separator/purifier thermally coupled to the second fluid loop and configured to purify the second inert gas
  by extracting a portion of tritium, tritiated water or steam, helium, and impurities swept by the second inert gas from the plurality of breeder spheroids within the nested pebble blanket,
and return the purified second inert gas to the nested pebble blanket.

* * * * *

UNITED STATES PATENT AND TRADEMARK OFFICE
CERTIFICATE OF CORRECTION

PATENT NO. : 12,254,994 B1
APPLICATION NO. : 18/600271
DATED : March 18, 2025
INVENTOR(S) : Vittorio Badalassi It is certified that error appears in the above-identified patent and that said Letters Patent is hereby corrected as shown below:

In the Drawings

Sheet 4 of 6 containing FIG. 4 and Sheet 6 of 6 containing FIG. 6 are replaced by replacement sheets of FIG. 4 and FIG. 6, respectively that are attached.

Signed and Sealed this
Seventh Day of October, 2025

John A. Squires
*Director of the United States Patent and Trademark Office*